United States Patent [19]

Severeid et al.

[11] 4,374,027

[45] Feb. 15, 1983

[54] PROCESS FOR THE SECONDARY TREATMENT OF WASTEWATER

[75] Inventors: David E. Severeid, Shelton; Daryl D. Jech, Seattle, both of Wash.

[73] Assignee: International Telephone and Telegraph Corporation, New York, N.Y.

[21] Appl. No.: 14,853

[22] Filed: Feb. 26, 1979

Related U.S. Application Data

[63] Continuation-in-part of Ser. No. 875,327, Feb. 6, 1978, abandoned.

[51] Int. Cl.³ .............................................. C02F 3/12
[52] U.S. Cl. .................................... 210/608; 210/610; 210/627; 210/629; 162/29
[58] Field of Search .................... 210/3, 4, 5, 6, 7, 8, 210/11, 13, 15, 44, 63 R, 195 S, 221 P, 608, 610, 611, 623–629, 703–707, 195.3, 195.4, 221.1, 221.2; 162/29

[56] References Cited

U.S. PATENT DOCUMENTS

| | | | |
|---|---|---|---|
| 3,236,766 | 2/1966 | Levin | 210/15 |
| 3,264,213 | 8/1966 | Pau | 210/15 |
| 3,356,609 | 12/1967 | Bruemmer | 210/11 |
| 3,397,140 | 8/1968 | Dea | 210/44 |
| 3,547,814 | 12/1970 | McWhirter | 210/7 |
| 3,574,331 | 4/1971 | Kurosawa | 210/195 S |
| 3,576,738 | 4/1971 | Duffy | 210/44 |
| 3,617,539 | 11/1971 | Grutsch | 210/13 |
| 3,764,524 | 10/1973 | Stankewick | 210/7 |
| 3,884,803 | 5/1975 | Traylor | 210/44 |
| 4,069,149 | 1/1978 | Jackson | 210/44 |
| 4,086,160 | 4/1978 | Roesler | 210/13 |

OTHER PUBLICATIONS

Deep Shaft Aeration Process for Effluent Treatment, Institute of Chemical Engineers, York, England, Apr. 16/17, 1975.
New Civil Engineer, B. Appleton, Apr. 17, 1975.
Metcalf and Eddy, Inc., Wastewater Engineering, McGraw-Hill, 1972, pp. 497–498.
Bacteria to Consume Waste in Revolutionary Treatment Plant of West Virginia Pulp and Paper Co., Southern Pulp and Paper Manufacturer, Aug. 10, 1954.

*Primary Examiner*—Ernest G. Therkorn
*Attorney, Agent, or Firm*—James B. Raden; Harold J. Holt

[57] ABSTRACT

A process for the secondary treatment of wastewater by a modified air activated sludge system comprising aerating wastewater containing bacteria until the BOD level of the wastewater is reduced by at least 90%, the food to microorganism ratio of the wastewater being greater than one, introducing the aerated wastewater under pressure to a flotation cell to separate suspended solids including bacteria from the pressurized wastewater by dissolved air flotation clarification, recycling said suspending solids and bacteria to said aeration step in an amount sufficient to maintain said food to microorganism ratio and removing and disposing of the remaining reduced BOD level wastewater.

9 Claims, 1 Drawing Figure

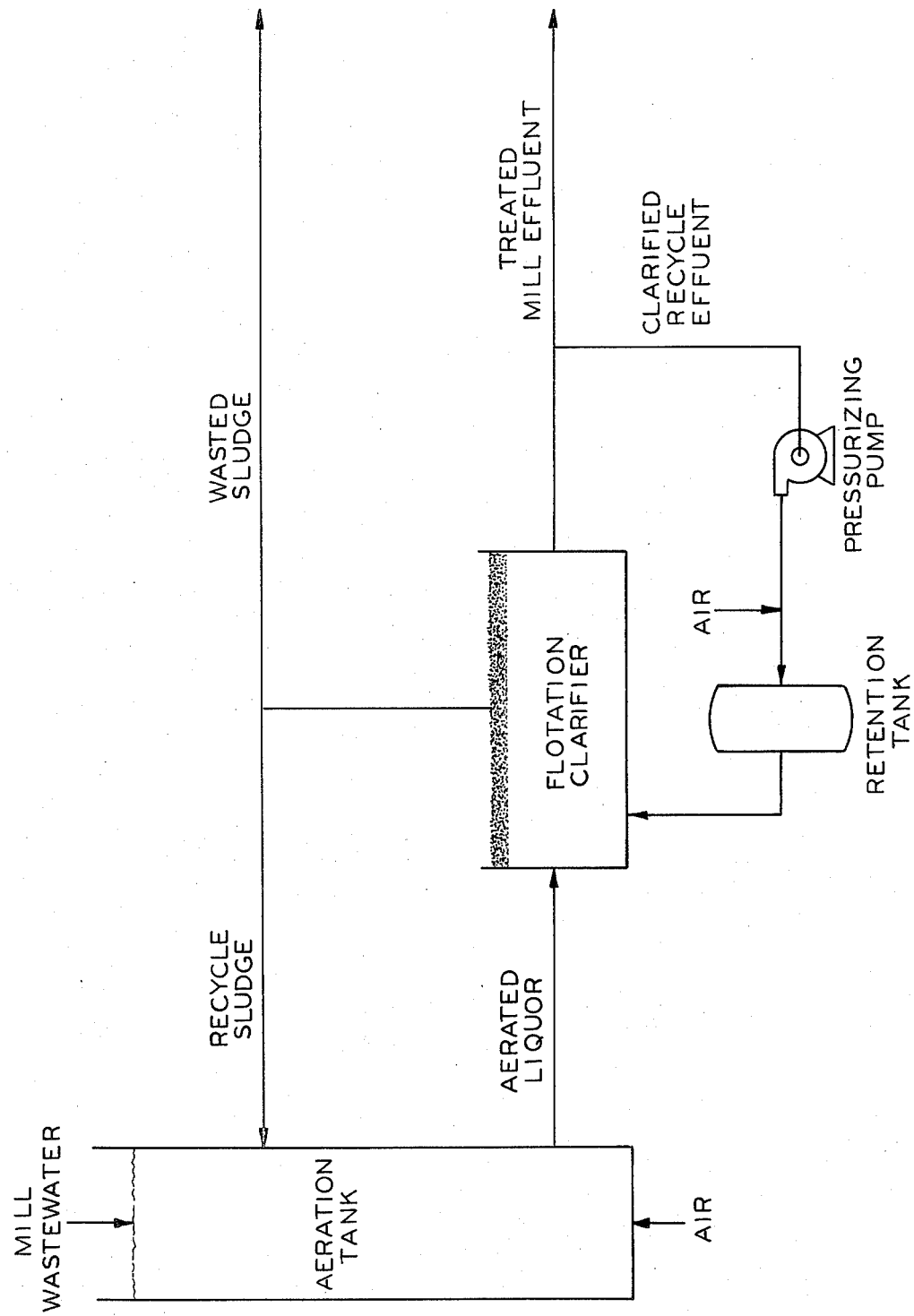

PROCESS FOR THE SECONDARY TREATMENT OF WASTEWATER

This application is a continuation-in-part of our co-pending application Ser. No. 875,327, filed Feb. 6, 1978 and now abandoned.

This invention relates to a process for the secondary treatment of wastewater and particularly to the secondary treatment of sulfite pulp mill effluent.

Secondary treatment processes reduce organic (BOD) content of wastewater through biological activity. In general, wastewater is intimately mixed with a bacterial population which utilizes the organic material as a food source. Nutrient addition, aeration, and adjustment of pH and temperature are employed to provide an environment suitable for survival and reproduction and thus insure bacteria growth. Normally the biomass produced during aeration is separated from the treated water before discharge to the receiving water.

At locations where land area is not plentiful, biological treatment is generally accomplished in high-rate air activated sludge (AAS) systems. In such systems, BOD removal is achieved in an aeration basin. The liquor and biomass from the aeration basin are sent to a gravity clarifier where the biomass is recovered, thickened, and recycled to the aeration basin. This maintains a high biomass concentration in the aeration basin and, for an aeration basin of constant volume, increases the BOD removal efficiency. It can be seen that satisfactory biomass settleability is essential to achieving optimum performance in an AAS system. The AAS process generates excess biomass which must be wasted from the system and handled separately.

It is generally accepted that the performance of an AAS system is governed by the organic loading expressed as the food-to-microorganism (F/M) ratio. The F/M ratio is defined as the total wastewater BOD fed to the system per day per unit of biomass maintained in the aeration basin. BOD removal efficiency generally worsens rapidly as the F/M ratio is increased. Biomass settleability is adversely affected by a very low or very high F/M ratio. Therefore, AAS systems are normally designed with an F/M ratio of 0.2–0.5 to obtain both good treatment efficiency and a satisfactory biomass settling rate. The F/M ratio is also important because it is related to the size of the treatment plant.

A recent variation of the AAS process involves aeration in a deep tank. Deep tank aeration utilizes an above or below ground tank of at least 9 meters, normally greater than 15 meters, depth. The depth of the tank creates a hydrostatic pressure of sufficient magnitude to increase the rate of oxygen transfer to that the aerobic bacteria are much more efficiently supplied with the air they require than is the case with activated sludge processes. Deep tank aeration processes are disclosed at a number of places in the literature, as for example, in U.S. Pat. No. 3,574,331.

While clarification of aerated liquor is conventionally carried out by gravity separation, there have been suggestions that deep tank aeration be coupled with dissolved air flotation clarification. Dissolved air (or gas) flotation is a well-known solid-liquid separation process. In dissolved air flotation, the wastewater, saturated with air under pressure, enters a flotation cell maintained at atmospheric pressure. The reduction in pressure causes the air to be released from solution in the form of fine bubbles which attach to the sludge or other suspended material and carry them to the surface of the water in the flotation cell. Dissolved air flotation is frequently used as a method for recovering fibers or thickening biomass wasted from activated sludge systems. There are, however, few cases where dissolved air flotation has been used for clarification in secondary treatment systems, i.e., for both solids removal and for recovery and recycle of bacteria. The combination of dissolved air flotation with deep tank aeration has been suggested as possessing advantages over a conventional AAS system. See for example *New Civil Engineer*, B. Appleton, Apr. 17, 1975.

Regardless of which type of secondary treatment system is used, the size of the treatment plant and hence capital costs could be reduced by lowering the amount of bacteria needed to reduce a given amount of BOD or, stated otherwise, by increasing the F/M ratio. Organic loading, expressed as the F/M ratio, is generally accepted as governing the performance of a secondary treatment system. See, for example, Adams & Eckenfelder, *Process Design Techniques for Industrial Waste Treatment*, Nashville, Tennessee, Enviro Press Inc., 1974. However, the use of F/M ratios of over about 0.5 has generally not been considered feasible with conventional AAS systems. The use of significantly different ratios for deep tank aeration/dissolved air flotation systems has also been ruled out for fear of unacceptable BOD removal. Moreover, sudden changes in the BOD level of the wastewater, its flow rate, temperature or pH create what is known as shock loadings which depress the efficiency of the system. It has generally been felt that high F/M ratios in such deep tank systems would be susceptible to shock loadings because of the short treatment retention time associated with a high F/M.

It is accordingly a primary object of this invention to provide a process for the secondary treatment of wastewater which successfully utilizes higher food-to-microorganism ratios than have heretofore been possible.

It is an additional object of this invention to provide a secondary treatment process for wastewater which minimizes the size of treatment facilities and hence, their capital costs.

It is a more specific object of this invention to provide an economical but efficient process for the secondary treatment of sulfite pulp mill effluent.

It has now been found that food-to-microorganism ratios greater than one may be successfully utilized in the secondary treatment of wastewater by a modified air activated sludge system which achieves reductions in BOD level of at least 90%. F/M ratios up to ten-fold higher than that of conventionally designed activated sludge systems have been successfully utilized. More specifically, the present invention involves a process for the secondary treatment of wastewater by a modified air activated sludge system comprising aerating wastewater containing bacteria, under conditions in which bacteria growth occurs, by continuously metering diffused air into a complete mix reactor until the BOD level of the wastewater is reduced by at least 90%, the food-to-microorganism ratio of the wastewater being greater than one, introducing the aerated wastewater to a flotation cell to separate suspended solids including bacteria from the wastewater by dissolved air flotation clarification, recycling said suspended solids and bacteria to said aeration step in an amount sufficient to maintain said food-to-microorganism ratio and removing and disposing of the remaining reduced BOD level wastewater.

The single FIGURE of the drawing is a schematic flow diagram of the process of the invention.

The process of the invention has been found, quite surprisingly, to achieve excellent BOD and toxicity removal efficiency through a range of F/M ratios of from 1 to 4 and even higher. It was also found, again surprisingly, that the process was quite immune to shock loadings, even at these higher F/M ratios. During a severe shock loading trial with spent sulfite liquor, in which the F/M ratio was more than doubled and the biomass suffered anaerobic conditions for 12 hours, the BOD removal efficiency was almost unaffected, dropping from 96% to 94% and returning to 96% the day after the shock. In addition, the BOD treatment efficiency of the system was unaffected by an abrupt change in temperature (from 30° C. to 20° C. in 24 hours). Moreover, studies have shown that the dissolved gas flotation clarifier consistently achieved greater than 90% solids recovery, even during spent sulfite liquor shock loadings.

Although the reasons for successful operation at the higher F/M ratios useful in the invention are not fully understood, it is believed at least in part to result from the faster solids separation achieved through the use of dissolved air flotation. Thus, the elapsed time from completion of aeration, through clarification, back to aeration is believed insufficient to kill a significant amount of bacteria. In conventional gravity clarification systems, a substantial number of the aerobic bacteria are believed to be killed during the prolonged clarification step. In the present process, recycling of the suspended solids and bacteria occurs rapidly—typically within 10-15 minutes, usually in less than thirty minutes and rarely in more than an hour.

The process of the present invention is schematically shown in the drawing. Except to the extent herein set forth, the first step of the process, aeration, is carried out in accordance with well known prior art techniques. In the case of a sulfite mill, mill wastewater normally includes primary treated wastewater and clear effluent from spent sulfite liquor, hot caustic extraction and bleach plant effluent. As shown in the flow diagram, the wastewater is fed to an aeration tank where it is neutralized to a pH of about seven with caustic or lime and then nitrogen and phosphorus nutrients in the form of, for example, ammonium hydroxide and phosphoric acid are added. The wastewater is then aerated with air (1) to keep the system turbulent and (2) the bacteria well distributed and (3) to provide oxygen during the retention time in the aeration tank. Aeration may be carried out in a shallow basin with conventional air activated sludge (AAS) systems, but is preferable that aeration be carried out in a deep tank or column. In deep tank aeration, diffused air is metered into the bottom of the tank at a rate sufficient to provide the desired dissolved oxygen concentration. Non-absorbed gases leave the top of the column, which is open to the atmosphere. In the case of sulfite pulp mill effluent, BOD levels are very high, generally over 400 mg/l and as high as 1000 to 1200 mg/l during manufacture of high purity dissolving pulp, as contrasted with a BOD level of about 200 mg/l for municipal wastewater. Retention time in the aeration tank can be much lower with the deep tank aeration systems as compared with the conventional AAS systems (i.e., 3-8 hours vs. 20-24 hours). Aeration should reduce the soluble BOD level by at least 90%, depending on the F/M ratio and the wastewater treated.

In accordance with the present invention, the F/M ratio in the aeration tank is maintained at an average level higher than one. The F/M ratio as used herein means the total wastewater BOD in grams fed to the aeration basin per day per gram of biomass (volatile suspended solids) maintained in the aeration basin. BOD or biochemical oxygen demand as used herein is defined as the amount of oxygen (mg/l) consumed by microorganisms in five days at 20° C.

Upon completion of aeration the aerated wastewater is transferred to a dissolved air flotation clarifier. Aerated liquor is introduced into the clarifier with sludge and clarified effluent being removed from the clarifier top and bottom, respectively. A portion of the clarified effluent is aerated under pressure (by passing it through a pressurizing pump and small retention tank) and recycled to the clarifier to increase the amount of dissolved gas available for flotation. Recycle through the pump and retention tank is desirable with deep tank aeration systems to increase clarifier efficiency. Such recycle is necessary with systems using shallow aeration tanks to introduce the dissolved gases under pressure to effect the flotation clarification action. Dissolved air flotation systems in which the effluent is partially or wholly recycled through a pump and retention tank are known and are disclosed, for example, in Metcalf and Eddy, Inc., *Waste Water Engineering: Collection, Treatment and Disposal*, New York, McGraw-Hill, 1972, pages 296 to 301.

As a blanket of float (solids and bacteria) builds up in the clarifier, the uppermost float is pushed above the liquid level and allowed to drain. Thus, the deeper the float blanket the higher the solids concentration of the skimmings. This is also true for increased air-to-solids ratios which increase the air available for flotation. The top of the float blanket is continuously removed in commercial scale facilities and scraped up on an inclined beach where it drains further. A normal depth for the float blanket of a commercial unit is about 10 cm.

The following examples are illustrative of the practice of the invention. Unless otherwise indicated, all parts are by weight.

EXAMPLES 1-6

The total effluent from a sulfite pulping mill was neutralized with caustic to a pH of 7.5, heated with indirect steam to 30° C., fortified with phosphorus and nitrogen nutrients (P:N:BOD~1:10:100) and then fed to an aeration tank. A deep tank aeration-dissolved air flotation system of the type shown schematically in the drawing was used. The aeration vessel was a 10 centimeter (i.d.) column with 4.62 meter working depth, equivalent to a working volume of 40 liters. A pressure reducing valve at the top of the column was adjusted to maintain a back pressure of 69 KPag (Kilo pascals gauge) at the top of the column to simulate a deep tank having a working depth of 18.3 meters. The dissolved oxygen concentration of the mixed liquor in the aerator was maintained at 2-3 mg/l. The clarifier was a 5.6 cm. (i.d.) by 46 cm. tall tube. The mixed liquor was introduced by a variable speed metering pump into the clarifier with sludge and clarified effluent being removed from the clarifier top and bottom respectively. A portion of the clarified effluent was re-aerated under pressure and recycled to the clarifier to increase the amount of dissolved gas available for flotation. Table 1 records the operating conditions and results of six successive tests (Examples 1-6) at varying F/M ratios. The liquor retention time is the residence time of the feed liquor in the aeration tank. The temperature of the mixed liquor was lowered from 30° to 20° C. in order to simulate a more severe temperature condition which might be faced at a sulfite pulp mill. The lower the temperature the slower the bacterial action. The F/M ratios given are the average of the F/M ratios during each example test period. MLVSS stands for mixed liquor volatile suspended solids and is the term used to denote the suspended solids concentration (Mg/l) in the aeration tank.

TABLE I

| | Operating Conditions | | | Analyses | | Calculated Results | |
|---|---|---|---|---|---|---|---|
| | Liquor Retention | Mixed Liquor | Applied F/M Ratio, gm/BOD$_5$/gm | MLVSS | Soluble BOD$_5$, mg/l | | Soluble BOD$_5$ Removal, | Sludge Age |
| Example | Time, hr. | Temp., °C. | MLVSS/day | mg/l | Feed | Effluent | % | Days |
| 1 | 7.0 | 30 | 0.6 | 5190 | 807 | 12 | 98.5 | 8.9 |
| 2 | 7.0 | 30 | 1.0 | 3240 | 775 | 12 | 98.5 | 3.6 |
| 3 | 7.0 | 20 | 0.9 | 2790 | 656 | 14 | 97.8 | 3.6 |
| 4 | 7.0 | 20 | 1.9 | 1490 | 673 | 34 | 95.3 | 2.0 |
| 5 | 3.5 | 20 | 2.0 | 2930 | 812 | 37 | 95.4 | 1.7 |
| 6 | 3.5 | 20 | 4.0 | 934 | 544 | 33 | 94.0 | 0.6 |

Table I shows that at F/M ratios of from 0.6 to as high as 4.0, high BOD removal rates are achieved. Prior literature has indicated that at these high F/M ratios, and particularly at ratios over 1, high soluble BOD removal levels could not be maintained. The column headed "Sludge Age" measures the average age of the bacteria in the aeration tank. The lower the sludge age, the smaller the treatment system can be. Ideally, sludge age should be as low as possible to minimize treatment costs but without sacrifice of high soluble BOD removal rates. It will be seen that at F/M ratios over 1, sludge age is reduced by order of magnitude with only a slight drop in BOD removal.

EXAMPLE 7

In this example, mill effluent was treated as in Examples 1-6 except that the system was subjected to a series of shock loadings of up to 12 hours duration over a two week period. The F/M ratio was targeted at one, the mixed liquor temperature at 20° C., the retention time at 7 hours and the MLVSS concentration at about 2500 mg/l. After each shock, the system was operated for 2-3 days at nominal (target) conditions to allow it to recover from the shock. The magnitude of the shocks was determined by assuming that the full-scale system would have to treat its normal load plus all the spent sulfite liquor (SSL) solids generated by the mill for periods of 4-12 hours duration. This amount of SSL at 10% solids concentration would approximately double the influent BOD concentration yet have a negligible effect on the hydraulic loading to the system. Prior to each shock, the nominal air rate was determined experimentally and the air rate was then restricted during the shock. The restriction on air simulates the finite compressor capacity in a full-scale system. The first shock was limited to 50% extra air while the fourth was limited to no extra air. The first simulates a system which normally needs two air compressors but a third is available for shock loads. The fourth shock simulates the same system with only the two compressors, no extras. The results of these tests are set forth in Table II.

TABLE II

| Shock Number | 1 | 2 | 3 | 4 |
|---|---|---|---|---|
| Duration of Shock, hr. | 4 | 6 | 12 | 12 |
| Period After Shock, days | 2 5/6 | 3¾ | 3½ | 3½ |
| Air Rate | | | | |
| Nominal, SLPM* | 4.3 | 4.4 | 4.1 | 3.7 |
| Avg. Day of Shock, SLPM | 6.2 | 8.2 | 5.7 | 3.6 |
| Maximum, % of Nominal | 149 | 211 | 180 | 97 |
| Influent Total BOD$_5$ (Nominal), mg/l | 848 | 868 | 823 | 732 |
| Applied F/M Ratio | | | | |
| During Shock | 2.63 | 2.40 | 2.01 | 2.44 |
| Day of Shock (Nominal) | 1.28 | 1.07 | 0.83 | 1.01 |
| Avg. Day of Shock | 1.51 | 1.40 | 1.44 | 1.74 |
| Day Before Shock | 1.27 | 0.96 | 0.96 | 1.27 |
| Day After Shock | 0.99 | 1.12 | 0.74 | 0.93 |
| Avg. for Entire Period | 1.15 | 1.13 | 1.17 | 1.38 |
| Effluent Soluble BOD, mg/l | | | | |
| Day Before Shock | 30 | 32 | 25 | 31 |
| Day of Shock | 47 | 32 | 28 | 71 |
| Day After Shock | 34 | 32 | 24 | 27 |
| Soluble BOD Removed, % | | | | |
| Day Before Shock | 96.0 | 96.2 | 96.9 | 95.9 |
| Day of Shock | 95.1 | 96.8 | 97.9 | 94.4 |
| Day After Shock | 95.9 | 96.5 | 97.0 | 95.7 |

*SLPM is: standard liters per minute.

The stability of soluble BOD removed during shock loads should be noted. The results indicate an ability to withstand severe shock loadings in succession without irrevocable damage to the biomass. It should be noted that in shock 4, in which the F/M ratio was more than doubled and the biomass suffered anaerobic conditions for 12 hours, the BOD removal efficiency was almost unaffected, dropping from 96% to 94% and returning to 96% the day after the shock.

The foregoing results indicate that the present process is capable of excellent and reliable treatment of wastewater at F/M ratios as high as ten-fold greater than that of conventional activated sludge systems.

We claim:

1. A process for the secondary treatment of wastewater by a modified air activated sludge system comprising aerating wastewater containing bacteria, under conditions in which bacteria growth occurs, by continuously metering diffused air into a complete mix reactor until the BOD level of the wastewater is reduced by at least 90%, the food to microorganism ratio of the wastewater treatment system being greater than one, introducing the aerated wastewater to a flotation cell to separate suspended solids including bacteria from the wastewater by dissolved air flotation clarification, recycling said suspended solids and bacteria to said aeration step in an amount sufficient to maintain said food to microorganism ratio and removing and disposing of the remaining reduced BOD level wastewater.

2. The process of claim 1 in which the wastewater is aerated in a deep tank aeration system.

3. The process of claim 1 in which a portion of the clarified wastewater effluent is recycled to the flotation cell.

4. The process of claim 1 in which the BOD of the wastewater is greater than 400 mg/l.

5. The process of claim 4 in which the wastewater is sulfite pulp mill effluent.

6. The process of claim 1 in which the bacteria are recycled to the aeration step in a time insufficient to kill a significant amount of said bacteria.

7. The process of claim 6 in which the bacteria are recycled to the aeration step in less than 30 minutes after completion of aeration.

8. The process of claim 1 in which bacteria growth in the wastewater is assured by substantially neutralizing the wastewater and adding thereto nitrogen and phosphorus nutrients.

9. The process of claim 1 in which at least a portion of said wastewater, after aeration in the complete mix reactor, is further aerated under pressure to increase the efficiency of the flotation separation step.

* * * * *